Jan. 24, 1950 — G. F. RYAN — 2,495,388
RECORD DEVICE
Filed July 30, 1946 — 2 Sheets-Sheet 1
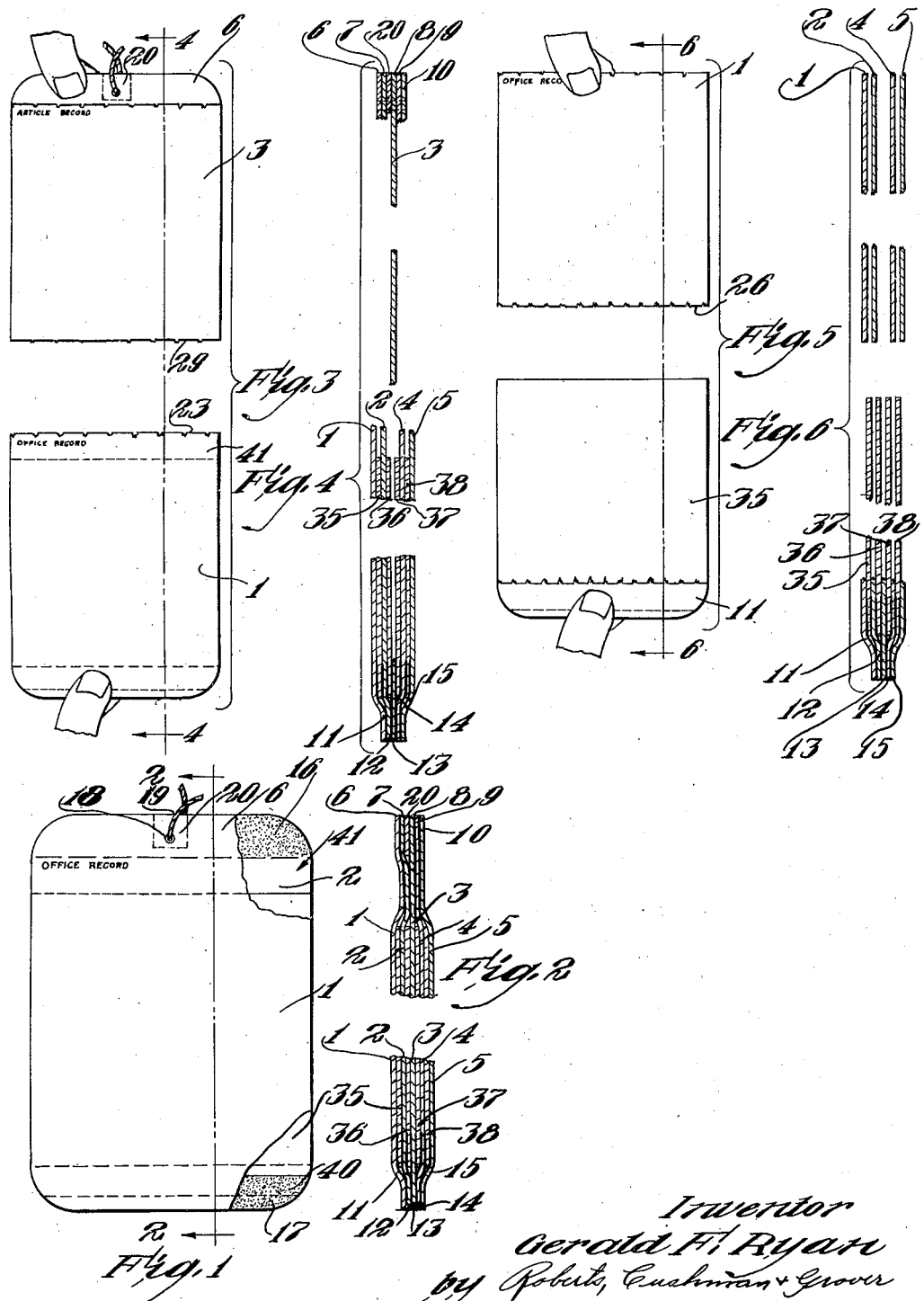
Inventor
Gerald F. Ryan
by Roberts, Cushman & Grover
Att'ys.

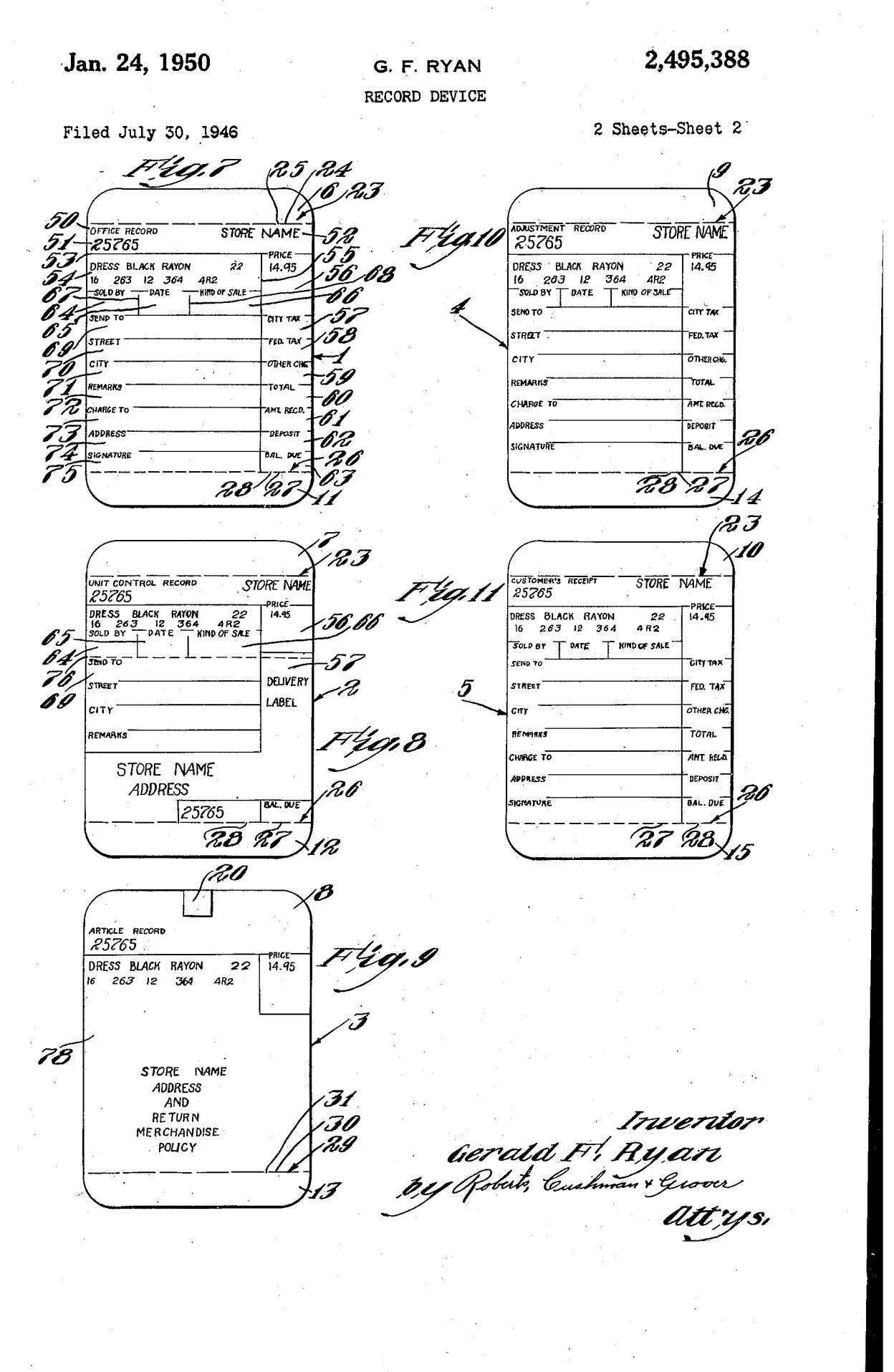

Jan. 24, 1950 — G. F. RYAN — 2,495,388
RECORD DEVICE
Filed July 30, 1946 — 2 Sheets-Sheet 2

Inventor
Gerald F. Ryan
by Roberts, Cushman & Groover
Att'ys.

Patented Jan. 24, 1950

2,495,388

UNITED STATES PATENT OFFICE 2,495,388

RECORD DEVICE

Gerald F. Ryan, Nashville, Tenn.

Application July 30, 1946, Serial No. 687,143

13 Claims. (Cl. 282—23)

This invention relates to a record device and more particularly to a record device for use in connection with the sale of goods and merchandise as for example in department stores or the like, said device including all records essential to an efficient, accurate and economical sales recording system.

Heretofore the attempts to collect and facilitate the handling of the many records essential to the complicated sales systems of department stores as for example office, adjustment and unit control records, delivery labels, packing slips, sales vouchers and customers receipts have taken the form of bulky and unsightly sales books with flapping and misaligned pages, misplaced and distorted carbons, the books often becoming misplaced or lost and sales persons often mistakingly recording their sales in books other than their own. A great deal of efficiency is lost by sales persons stuffing carbon paper into the book forms, keeping the papers in line, straightening them, matching numbers of sections, and then, after writing the sale, unshuffling the sections and carbons to prepare for the next sale.

In addition, the numerous and complicated entries required to be made in said books have resulted in loss of time, the making of frequent errors and inaccuracies, the necessity for providing training facilities, faulty recording because of illegibility and indeed, the opportunity for dishonest entries. Furthermore, it has heretofore been the practice to attach a price tag to the merchandise to be sold completely independent of and isolated from the records contained in the sales book. This practice has resulted in numerous errors and loss of time in transferring the data on the price tag to the sales book records, in confusion between department numbers because of transferring errors, in lost time and additional expense in checking and comparing data on the price tag with data entered in the sales book and in confusion because of separation of the price tag from the article for recording purposes.

The object of my invention is to provide a record device of the character described which facilitates the handling of sales transactions by simplifying the work of the sales clerk, which does away with the bulky, awkward and unsightly sales book and which eliminates or mitigates to a marked extent the above enumerated disadvantages attendant to the use thereof. Other objects of my invention are to provide a record device which provides flexibility and simplicity of operation, which is neat and compact, which is easy and inexpensive to manufacture and which requires a minimum of entries, all of which characteristics are conducive to speed, accuracy and economy in the handling of the sales records and the completion of the sales transaction. Still another object is to provide a record device which obviates the isolation of the price tag from the sales records and thereby provides for speed, accuracy and economy as a result of the elimination of transferring sales data, checking and comparing the transferred data and the confusion resulting from the loss and separation of associated records.

In one aspect the invention involves a record pad comprising a set of superposed sheets having weakened lines extending thereacross, certain of the lines being relatively weak and other of the lines relatively strong, so that when the ends of the pad are pulled in opposite directions at least one of the sheets parts at a weak line and is removed from the pad, and when the ends of the pad are again pulled in opposite directions another of the sheets parts at a strong line and is removed. Preferably the weakened lines are adjacent opposite ends of the pad, certain of the lines at one end being relatively weak and other of the lines at the other end being relatively strong.

In a more specific aspect the set of superposed sheets have tabs at opposite ends fastened together to form an end stub at each end of the pad, certain of the tabs being interconnected with certain of the sheets along weakened lines, certain of the lines being relatively weak and other of the lines being relatively strong so that when the tabs at opposite ends are pulled in opposite directions, certain of the sheets part at said relatively weak lines to divide the sheets into two groups and when the tabs of one group and the opposite end of said group are then pulled in opposite directions certain of the sheets part at said relatively strong lines to divide the sheets into two groups, whereby the sheets may be divided into three groups in response to two end pulls without separating the sheets before pulling. One sheet may have a weak line interconnecting it with one tab at one end and a strong line connecting it with a second tab at the second end, and a second sheet may have a weak line connecting it with a tab at said second end so that when the tabs at opposite ends are pulled in opposite directions said first sheet parts from its tab at said first end and said second sheet parts from its tab at said second end, and a third sheet may be fast to said second tab, the third sheet being shorter than the first sheet so that the first sheet can be gripped at said first end without gripping the third sheet, so that the first sheet may be separated from the second tab and third sheet by pulling in opposite directions on said first end of the first sheet and said second tab. The said third sheet may be a carbon sheet.

In a preferred aspect the invention involves a sales tag designed for association with an article comprising a set of superposed sheets having means at one end for attaching the sheets to said article, the attached ends and free ends being respectively fast together, certain of said sheets having sets of weakened lines thereacross adjacent their ends, the set adjacent the attached ends being relatively weak and the set adjacent the free ends being relatively strong, the remaining sheet having a relatively weak line adjacent its free end, so that when the ends of the set of sheets are pulled in opposite directions the sheets part at said relatively weak lines to divide the sheets into two groups, one group remaining attached to the article, the second group being released therefrom, and when the ends of the second group are pulled in opposite directions the sheets part at said relatively strong lines to separate the sheets from each other for individual distribution. The sheets may have end tabs at the attached ends and free ends respectively fast together, certain of the tabs being interconnected with certain of the sheets along sets of weakened lines, the set adjacent the attached end tabs being relatively weak and the set adjacent the free end tabs being relatively strong, the remaining sheet having a relatively weak line adjacent its free end tab.

In still another aspect the superposed sheets of the sales tag have means at one end for attaching a group of the sheets including the top and bottom sheets to said article, the attached ends and free ends being respectively fast together, the sheets of said group having sets of weakened lines thereacross adjacent their ends, the set adjacent the attached ends being relatively weak and the set adjacent the free ends being relatively strong, a second group of the sheets fast to the first group at their free ends and terminating short of the relatively weak lines of said first group so that the ends of the first group can be gripped adjacent the relatively weak lines without gripping the second group, and a remaining sheet fast to one of the sheets of the first group at its attached and free ends and having a relatively weak line adjacent its free end so that when the ends of the set of superposed sheets are pulled in opposite directions the sheets part at said relatively weak lines to separate the first and second groups from the remaining sheet, the latter remaining attached to the article, and when the ends of the first group are then pulled in opposite directions the first group parts at said relatively strong lines from its free ends to separate the sheets of the first group from the second group and the sheets of the first group from each other.

In a still more specific aspect the sheets of said first group and said remaining sheet are record sheets and the sheets of said second group are carbon sheets interposed between said record sheets and fast thereto at their free ends and terminating short of the relatively weak lines of said first group.

For the purpose of illustration a typical embodiment of the invention is shown in the accompanying drawing in which Fig. 1 is a plan view of the assembled record device with parts of the top sheet broken away;

Fig. 2 is an enlarged cross section along line 2—2 of Fig. 1;

Fig. 3 is a reduced plan view of the embodiment of Figs. 1 and 2 showing the manner and result of a first manipulation of the assembled record device;

Fig. 4 is an enlarged cross section along line 4—4 of Fig. 3;

Fig. 5 is a reduced plan view of the embodiment of the lower half of Figs. 3 and 4 showing the manner and result of a second manipulation thereof;

Fig. 6 is an enlarged section along line 6—6 of Fig. 5;

Figs. 7 through 11 are plan views of the successive record sheets of the embodiment of Fig. 1.

Referring to Figs. 1 and 2 of the drawings the numerals 1 through 5 represent a set of superposed record sheets having attachment end tabs 6 through 10 respectively for attachment to an article, and free end tabs 11 through 15 respectively, the record sheets and end tabs constituting a pad, said attachment and free end tabs being respectively fast together by suitable means as transverse layers 16 and 17 of adhesive or cement to form an end stub at each end of the pad. Each of the attachment end tabs are provided with an eye 18 to receive an article attachment filament 19, the attachment end tab 8 being provided at its eye with a reinforcement patch 20.

Referring to Figs. 7, 8, 10 and 11 which correspond to record sheets 1, 2, 4 and 5 respectively, the attachment end tabs 6, 7, 9 and 10 are interconnected with their respective record sheets by weakened lines 23 comprising a row of slits 24 and intermediate uncut portions 25. In a similar manner, the free end tabs 11, 12, 14 and 15 are interconnected with their respective record sheets by weakened lines 26 comprising a row of slits 27 and intermediate uncut portions 28. In each of record sheets 1, 2, 4 and 5 the weakened lines 23 are relatively weak and the lines 26 are relatively strong by providing longer slits 24 in lines 23 and shorter slits 27 in lines 26, the uncut portions 25 and 28 remaining a constant length. For example, in record sheet 1 (Fig. 7) the weakened line 23 comprises slits 24 on the order of ¼" while the slits 27 of line 26 are on the order of ⅛". In record sheet 2 (Fig. 8) the weakened line 23 comprises slits 24 on the order of ⅜" while the slits 27 of line 26 are on the order of ¼". Record sheets 4 (Fig. 10) and 5 (Fig. 11) are identical in this respect with record sheets 2 and 1 respectively. The attachment end tab 8 of record sheet 3 (Fig. 9) is integral with said record sheet but its free end tab is interconnected with said sheet by a weakened line 29 comprising a row of slits 30 on the order of ⅜" in length and intermediate uncut portions 31 thereby to provide a relatively weak line similar in strength to the lines 23 of record sheets 1, 2, 4 and 5. As shown in Figs. 1 and 2 when the record sheets are in superposed relation, the relatively weak lines 23 are aligned with each other and the relatively strong lines 26 are aligned with each other and the relatively weak line 29 of record sheet 3.

Again referring to Figs. 1 and 2, a set of carbon sheets 35 through 38 preferably of the type which are used once and then discarded, are interposed between record sheets 1, 2, 3, 4 and 5 respectively, and are fast to the rear face of free end tabs 11, 12, 13 and 14 respectively by suitable means as transverse layers 40 of adhesive or cement. At their opposite ends said carbon sheets terminate short of the weakened lines 23 of record sheets 1, 2, 4 and 5 to provide a gripping area 41 adjacent the ends of said record sheets for gripping said sheets without gripping the carbons as shown in the upper half of Fig. 5.

The record sheets 1 through 5 are designated in print respectively as office record, unit control record, article record, adjustment record and customer's receipt and each are provided at their upper left-hand corner with a rectangular space 50 for receiving said designation. Below said space is a similar space 51 to receive a printed identification number, common to all the record sheets. In the corresponding right-hand upper corner a space 52, common to each sheet is provided for the printed store name.

Below the space 51 and separated therefrom by a line 53, which marks the termination point of the interposed carbon sheets, is a rectangular space 54 common to each sheet to receive the description of the article to be sold, the size, color and fabric identification, the department, classification, manufacturer's and style numbers, the season letters and the cost price in code. To the right of space 54 and separated by line 55 is an approximately square space 56 also common to each sheet and identified by the printed word "price" to receive the selling price, a sufficient space being provided to permit the making of four separate price changes. Extending downwardly along the right-hand edge and below space 56 to the bottom of each of sheets 1, 4 and 5 are spaces 57 through 63 for receiving data relating to the financial end of the sale as for example city tax, federal tax, the total selling price, the amount of money received, the amount deposited and the balance due respectively as shown in Figs. 7, 10 and 11. Below space 54 of sheets 1, 2, 4 and 5 are three small spaces 64, 65 and 66 separated from each other by lines 67 and 68 to receive the initials of the sales clerk, the date of the sale and the kind of sale respectively, and identified by the printed words "sold by," "date" and "kind of sale." Below spaces 64, 65 and 66 and extending successively toward the bottom of sheets 1, 2, 4 and 5 are spaces 69 through 72 separated by transverse lines and adapted to receive the name of the consignee, street address, city address and remarks respectively and on sheets 1, 3 and 4 similar spaces 73, 74 and 75 are provided for entering data in connection with a credit sale comprising the name of the person to be charged, his address and signature respectively.

Referring to Fig. 8 the record sheet 2 differs from record sheets 1, 4 and 5 in that a weakened line 76 is provided and extends transversely of the sheet between spaces 64, 65, 66 and 56 and spaces 69 and 57, the portion below the line 76 constituting a delivery label adapted to be detached from the unit control stub along the weakened line 76. Record sheet 2 further differs from record sheets 1, 4 and 5 in that spaces 57 through 62, 73, 74 and a portion of 75 are blacked out by suitable means as printing ink so that the data which is recorded thereon through carbon sheet 35 is obscured to all but the closest inspection. The remaining portion of space 75 which has not been so blacked out receives the printed identification number common to all the record sheets. In the space corresponding to spaces 57 and 58 of sheet 1, the designation of the record is printed in contrasting color and similarly in the space corresponding to spaces 73 and 74 of sheet 1 the store name and address is similarly printed.

Referring to Fig. 9, the record sheet 3 constitutes in effect an identification and price tag as will later be described and differs from the other record sheets in that all spaces below spaces 54 and 56 are combined into a large space 78 to receive the printed store name, address and return merchandise policy.

In use and operation there is first typewritten or otherwise imprinted in spaces 54 and 56 of the top record sheet 1 of the assembled and printed record device of Figs. 1 and 2 information as above described and shown in Fig. 7 relating to the particular article to be sold. Said information is transferred onto the underlying sheets 2, 3, 4 and 5 and in the respective corresponding spaces thereof by means of the carbon sheets 35 through 38. The record device is then attached to the appropriate article by means of the attachment filament 19 in any well-known manner. From the foregoing, it is evident that all information required by customer and sales clerk and essential and necessary to the preparation of the sale now clearly appears on all record sheets which are in turn attached to the article and the sales clerk has no part in the writing of said information when the sale is made.

When the sale is made, the sales clerk firmly grips the attachment end tabs and free end tabs of the assembled record device between the thumb and forefinger of the opposite ends respectively and sharply pulls in opposite directions with the result shown in Figs. 3 and 4 of the drawings. The record sheets 1, 2, 4 and 5 part along their relatively weak lines 23 while the record sheet 3 parts along its relatively weak line 29 to divide the record device into two groups, one group comprising the record sheet 3 which remains attached to the article as an identification and price tag, and the other group comprising the remaining record sheets 1, 2, 4 and 5 and the carbon sheets, said second group being released from the article.

The sales person now takes the second group which still has the record and carbon sheets in perfect alignment, as shown in the lower half of Figs. 3 and 4, and makes the simple entries necessary to complete the sale in the appropriate spaces provided in the record sheet 1. Said entries are transferred onto the underlying record sheets 2, 4 and 5 and in the respective corresponding spaces thereof by the carbon sheets. In case of a credit sale the customer affixes his signature in the same manner.

The second group is then given to the cashier or charge authorizer as the case may be, who firmly grips the free end tabs between the thumb and forefinger of one hand and the record sheets at the gripping area 41 between the thumb and forefinger of the opposite hand and pulls in opposite directions with the result shown in Figs. 5 and 6. The record sheets 1, 2, 4 and 5 part at their relatively strong lines 26 from their respective free end tabs to separate said record sheets from the carbon sheets and from each other. The carbon sheets thus released are thrown away and the individual record sheets are distributed to the appropriate departments and customer, the delivery label being separated from the unit control sheet along the weakened line 76 when convenient.

From the foregoing it is evident that there has been detachably combined into one neat and compact unit designed for association with an article to be sold, a price and identification tag and all the record sheets required for a sales system whereby the handling of a sales transaction has been immeasurably facilitated, the old sales book and its many disadvantages has been done away with and the difficulties attendant to the isolation of the price tag from the record sheets has been eliminated.

While the record device of my invention is particularly adapted for use in a sales record system and especially the complicated sales system of large department stores, and while the description as an example of a typical embodiment was restricted to five record sheets having a space arrangement and space designation on the face thereof appropriate for such a sales system, it is to be understood that various changes in the arrangement of the spaces, the designation of the spaces, and the number of record sheets and carbons may be made without departing from the scope of the invention.

It should be further understood that the present disclosure is for the purpose of illustration only and that this invention includes all modifications and equivalents which fall within the scope of the appended claims.

I claim:

1. A record pad comprising a set of at least two superposed record sheets connected together at each end, one of the sheets having a weakened line extending thereacross adjacent to and inwardly of the connection at one end and the other sheet having a weakened line extending thereacross adjacent to and inwardly of the connection at the opposite end, said weakened lines being weaker than any other portion of the respective sheets, whereby the pad may be divided into two parts, each part including a substantial portion of one sheet, by pulling the ends of the sheets in opposite directions, the sheets parting along their weakened lines leaving the severed end of the said one sheet connected to the said other sheet and leaving the severed end of the said other sheet connected to the said one sheet.

2. A record pad comprising a set of at least three superposed record sheets connected together at each end, the outer sheets having a weakened line extending thereacross adjacent to and inwardly of the connection at one end, the intermediate sheet having a weakened line extending thereacross adjacent to and inwardly of the connection at the opposite end, said weakened lines being weaker than any other portion of the respective sheets, whereby the pad may be divided into two parts, each part including a substantial portion of at least one sheet, by pulling the ends of the sheets in opposite directions, the sheets parting along their weakened lines leaving the severed ends of the outer sheets connected to the intermediate sheet and leaving the severed end of the intermediate sheet connected to the still connected outer sheets.

3. A record pad comprising a set of at least three superposed sheets two of the sheets having end tabs at each end, the tabs at the one end being fast together and the tabs at the opposite end being fast together, and an intermediate sheet having an end tab at one end fast to the tabs of the said two sheets at their said opposite end, the tab at the one end of one of the two sheets being interconnected with its respective sheet along a weakened line, the tab at the opposite end of the other of the two sheets being interconnected with the said other sheet along a weakened line, the weakened lines being weaker than any other portion of the respective sheets whereby the pad may be divided into two parts each part including at least one sheet by pulling the tabs of the said two sheets in opposite directions, the tabs parting along the weakened lines leaving the severed tab of the said one of the two sheets connected to the tab at the said one end of the said other of the two sheets and leaving the severed tab of the said other of the two sheets fast to the tabs at the one end of the intermediate sheet and at the opposite end of the said one of the two sheets.

4. A record pad comprising a set of at least three superposed record sheets, the outer sheets having end tabs at each end, the tabs at the one end being fast together and the tabs at the opposite end being fast together, the tabs at the one end of the outer sheets being interconnected with their respective sheets along relatively weak weakened lines and the tabs at the opposite end of the outer sheets being interconnected with their respective sheets along relatively strong weakened lines, the intermediate sheet having a tab at one end fast to the tabs of the outer sheets at their said one end whereby the pad may be divided into two parts, each part including at least one sheet, by pulling the tabs of the outer sheets in opposite directions, the tabs parting along the relatively weak weakened lines to release the intermediate sheet from the pad after which the outer sheets still remaining in the pad may be separated from each other by pulling the remaining tabs and unconnected ends of the outer sheets in opposite directions, the outer sheets parting from the tabs along the relatively strong lines.

5. A record pad comprising a set of at least three superposed record sheets having end tabs at each end, the tabs at the one end being fast together and the tabs at the opposite end being fast together, the tabs at the one end of the outer sheets being interconnected with their respective sheets along relatively weak weakened lines and the tabs at the opposite end of the outer sheet being interconnected with their respective sheets along relatively strong weakened lines, the tab at the one end of the intermediate sheet being integral with its sheet and the tab at the opposite end of the intermediate sheet being interconnected with its sheet along a relatively weak weakened line, whereby the pad may be divided into two parts, each part including at least one sheet, by pulling the tabs of the sheets in opposite directions, the tabs parting along the relatively weak weakened lines to release the intermediate sheet from the pad after which the outer sheets still remaining in the pad may be separated from each other by pulling the remaining tabs and unconnected ends of the outer sheets in opposite directions, the outer sheets parting from the tabs along the relatively strong lines.

6. A record pad comprising a set of at least two superposed record sheets and an intermediate carbon sheet, the record sheets having end tabs at each end, the tabs at the one end being fast together and the tabs at the opposite end being fast together, the tab at the one end of one of the record sheets being interconnected with its respective sheet along a relatively weak weakened line, the tab at the opposite end of the said one of the record sheets being interconnected with its respective sheet along a relatively strong weakened line, the tab at the one end of the other of the record sheets being integral therewith and the tab at the opposite end of the other of the record sheets being interconnected with its respective sheet along a relatively weak weakened line, the carbon sheet having an end tab at one end fast to the tabs of the record sheets at their said opposite ends, the opposite end of the carbon sheet terminating short of the relatively weak weakened line of the said one record sheet, whereby the pad may be divided into two parts, each part including at least one record sheet, by pulling the tabs of the record sheets in opposite directions, the tabs parting along the relatively weak weakened lines leaving the severed tab of said one of the record sheets fast to the tab at the one end of the said other of the record sheets and leaving the severed tab of the said other of the record sheets fast to the tabs at the said one end of the carbon sheet and at the said opposite end of the said one of the record sheets after which the carbon sheet may be separated from the said one record sheet by pulling the unconnected and projecting end of the said one record sheet and the remaining tabs of the carbon and said one record sheet in opposite directions, the said one record sheet parting from its tab along the relatively strong weakened line.

7. A record pad comprising a set of superposed record sheets having end tabs at each end, the tabs at the one end being fast together and the tabs at the opposite end being fast together, one of the tabs of certain of the sheets being interconnected with its respective sheet along a relatively weak weakened line and the other tab of the said certain of the sheets being interconnected with its respective sheet along a relatively strong weakened line, one of the tabs at the opposite end of at least one other sheet being interconnected with its sheet along a relatively weak weakened line which is weaker than any other portion of said one other sheet, the said other tab of at least one of said certain sheets being disposed at the said opposite end of its respective sheet, whereby the pad may be divided into two parts, each part including at least one sheet, by pulling the tabs at each end of the sheets in opposite directions, one tab of each sheet parting along the relatively weak weakened lines to release at least the said one other sheet from the pad after which the sheets remaining in the pad may be separated from each other by pulling the remaining tabs and unconnected ends of the sheets in opposite directions, the tabs parting from the sheets along the relatively strong lines.

8. A record pad comprising a set of superposed record sheets having end tabs at each end, the tabs at the one end being fast together and the tabs at the opposite end being fast together, the tabs at the one end of certain of the sheets including the outer sheets being interconnected with their respective sheets along relatively weak weakened lines, the tabs at the opposite end of said certain of the sheets including the outer sheets being interconnected with their respective sheets along relatively strong weakened lines, the tab at the opposite end of a remaining intermediate sheet being interconnected with its respective sheet along a relatively weak weakened line which is weaker than any other portion of the said remaining intermediate sheet, whereby the pad may be divided into two parts, each part including at least one sheet, by pulling the tabs at each end of the sheets in opposite directions, one tab of each sheet parting along the relatively weak weakened lines to release the said remaining intermediate sheet after which the sheets remaining in the pad may be separated from each other by pulling the remaining tabs and unconnected ends of the sheets in opposite directions, the tabs parting from the sheets along the relatively strong weakened lines.

9. A sales tag designed for association with an article comprising a set of superposed record sheets having end tabs at each end, the tabs at the one end being fast together and the tabs at the opposite end being fast together, one of the tabs of certain of the sheets being interconnected with its respective sheet along a relatively weak weakened line and the other tab of the said certain of the sheets being interconnected with its respective sheet along a relatively strong weakened line, one of the tabs at the opposite end of at least one other sheet being interconnected with its sheet along a relatively weak weakened line which is weaker than any other portion of the said one other sheet, the said other tab of at least one of said certain sheets being disposed at the said opposite end of its respective sheet, means on the tabs at the said one end of the sheets for attaching the sheets to said article, whereby the tag may be divided into two parts, each part including at least one sheet, by pulling the tabs at each end of the sheets in opposite directions, one tab of each sheet parting along the relatively weak weakened lines to permit at least the said one other sheet to remain attached to the article and releasing the remainder of the tag after which the sheets remaining in the released remainder of the tag may be separated from each other by pulling the remaining tags and unconnected ends of the sheets in opposite directions, the tags parting from the sheets along the relatively strong lines.

10. A sales tag designed for association with an article comprising a set of superposed record sheets having end tabs at each end, the tabs at the one end being fast together and the tabs at the opposite end being fast together, the tabs at the one end of certain of the record sheets including the outer record sheets being interconnected with their respective record sheets along relatively weak weakened lines, the tabs at the opposite end of said certain of the record sheets including the outer record sheets being interconnected with their respective sheets along relatively strong weakened lines, the tab at the opposite end of a remaining intermediate record sheet being interconnected with its respective record sheet along a relatively weak weakened line, which is weaker than any other portion of the said remaining intermediate record sheet, and a set of carbon sheets interposed between said record sheets, the carbon sheets having tabs at one end fast to the tabs at the said opposite end of the record sheets, the other end of the carbon sheets terminating short of the relatively weak weakened lines of the said certain record sheets, means on the tabs at the said one end of the record sheets for attaching the record sheets to said article, whereby the tag may be divided into two parts, each part including at least one sheet, by pulling the tabs at each end of the record sheets in opposite directions, one tab of each record sheet parting along the relatively weak weakened lines to permit the said remaining intermediate record sheet to remain attached to the article and releasing the remainder of the tag, after which the record sheets may be separated from the carbon sheets and from each other for individual distribution by pulling the remaining tabs and unconnected and projecting ends of the record sheets in opposite directions the tabs parting from the record sheets along the relatively strong weakened lines.

11. A record pad comprising end stubs and intermediate record sheets including at least one inner sheet and an outer sheet on each side of the inner sheet, each outer sheet being connected to both end stubs, the connections at one end being weaker than at the other end, and the inner sheet being firmly connected to the end stub at the end where the outer sheets are weakly connected so that when the end stubs are pulled apart the outer sheets remain attached to one end stub and the inner sheet remains attached to the other end stub.

12. A record pad comprising end stubs and intermediate record sheets including at least one inner sheet and an outer sheet on each side of the inner sheet, the outer sheets being connected to the end stubs along weakened lines at both ends of the pad and the weakened lines being weaker at one end of the pad than at the other end, and the inner sheet being firmly attached to the end stub at the end where said weakened lines are weaker, whereby the outer sheets remain attached to one end stub and the inner sheet remains attached to the other end stub when they are pulled apart.

13. A record pad comprising end stubs and intermediate record sheets including at least one inner sheet and an outer sheet on each side of the inner sheet, said sheets being connected to the end stubs along weakened lines at both ends of the pad and the weakened lines of the outer sheets being weaker at one end of the pad and the weakened line of the inner sheet being weaker at the other end of the pad, whereby the outer sheets remain attached to one end stub and the inner sheet remains attached to the other end stub when they are pulled apart.

GERALD F. RYAN.

REFERENCES CITED

The following references are of record in the file of this patent:

UNITED STATES PATENTS

| Number | Name | Date |
| --- | --- | --- |
| 756,611 | Field | Apr. 5, 1904 |
| 1,774,090 | Gladfelter | Aug. 26, 1930 |
| 1,954,339 | Wilcox | Apr. 10, 1934 |
| 2,020,287 | Bonn | June 2, 1936 |